United States Patent Office 2,780,915
Patented Feb. 12, 1957

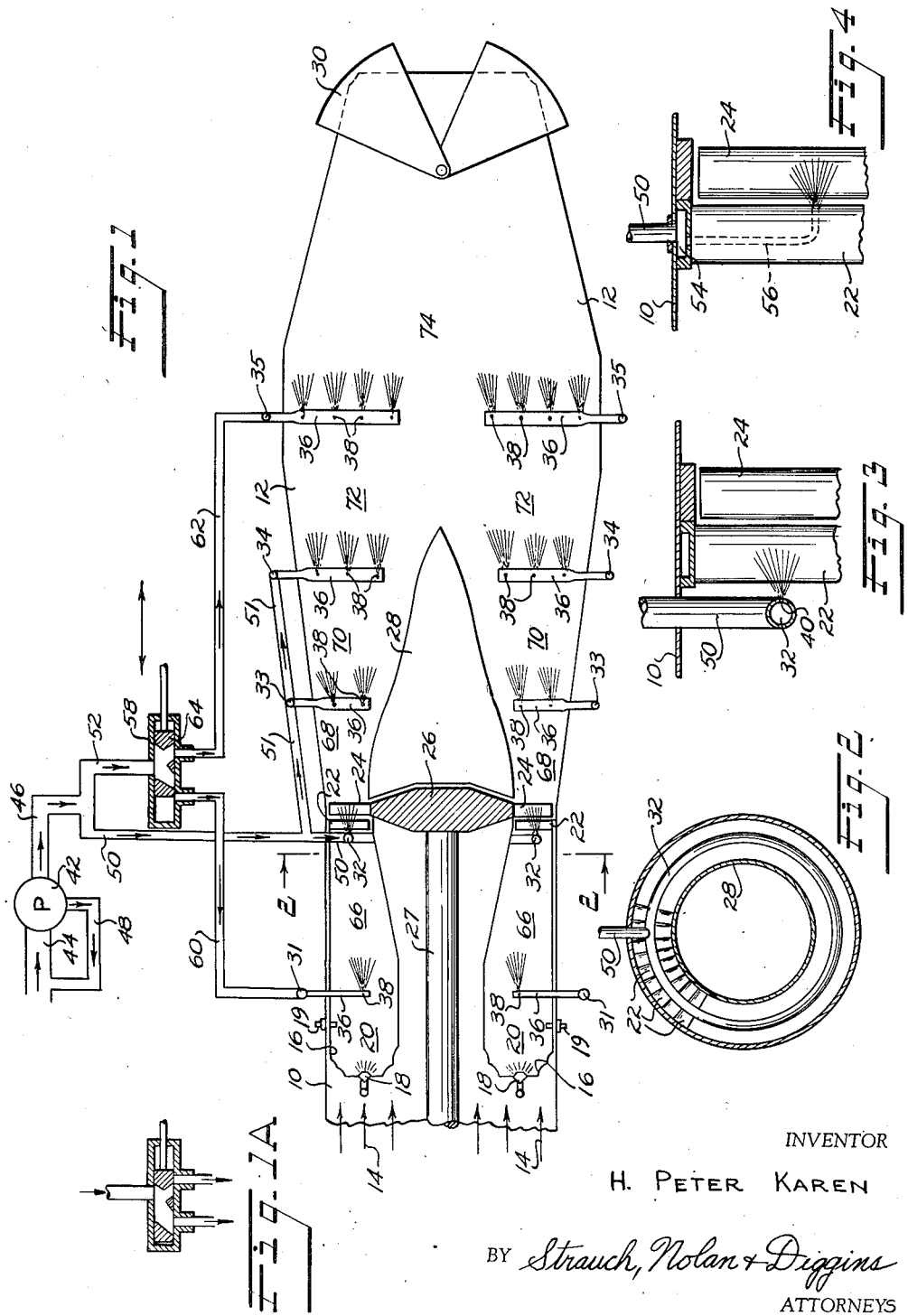

2,780,915

FUEL DISTRIBUTION SYSTEM FOR JET ENGINE AND AFTERBURNER

H. Peter Karen, San Diego, Calif., assignor to Solar Aircraft Company, San Diego, Calif., a corporation of California Application December 5, 1951, Serial No. 260,048

6 Claims. (Cl. 60—35.6)

This invention relates to jet power plants, and has particular reference to novel afterburner structure for use in a turbojet engine.

At the present time the importance of some type of afterburner structure to augment the thrust produced by a primary jet engine is becoming more and more widely recognized, and afterburners are now frequently incorporated as a standard part in jet propulsion installations for both military and commercial aircraft. Ever since the thrust boosting value of an afterburner first became recognized a variety of afterburner constructions and designs have been advanced by the aircraft and related industries in an effort to obtain a truly efficient unit. While many excellent afterburner structures have been proposed and are now in use, most of the originators of these structures have been confronted with, and have had to overcome, certain basic problems inherent in afterburner operation.

Briefly stated, the most important of these problems is to successfully establish stable afterburner combustion in the midst of a stream of extremely high velocity gases. This problem has usually been overcome by providing some kind of flameholder or sheltered combustion zone where a pilot flame can be established to spread combustion to the gases passing through the afterburner duct. Unfortunately, however, the above solution introduces further problems which have not been satisfactorily overcome heretofore. Thus, the flameholders which support the all-important pilot flame invariably result in the introduction of a substantial amount of undesirable obstruction in the afterburner duct which causes considerable turbulence and thrust losses in the primary engine output during the entire time the afterburner is not in use.

In order to overcome the foregoing design and operational problems the present invention provides a novel afterburner structure which eliminates altogether the need for any kind of flameholder or gutter structure. This end is accomplished by means of a novel multi-stage fuel injection arrangement which by controlling fuel injection rate and location insures highly efficient afterburner and primary engine operation without the use of flameholders. Accordingly, the primary object of this invention is to provide a greatly simplified afterburner structure.

Another important object of this invention is to provide an afterburner wherein stable afterburner combustion is completely controlled by a novel multi-stage fuel injection system.

A further important object of the invention is to provide an afterburner which eliminates the need for flameholders, and thus eliminates the primary engine thrust losses usually associated therewith.

Another object of the invention is the provision of an afterburner wherein improved altitude operational limits of the entire power plant are obtained by allowing afterburner combustion to be dependent only on the fuel-gas ratio and the gas temperature, thereby preventing the usual flameholder type of blowout.

Another object of the invention is to provide an afterburner wherein the primary engine turbine nozzle diaphragm and turbine blades are cooled by the injection of afterburner fuel directly on the blades, thereby causing cooling by quenching and evaporation.

A further object of the invention is the provision of a jet propulsion power plant wherein afterburner combustion is ignited by combustion in the primary engine, thereby eliminating the need for a separate afterburner ignition system.

Other objects and advantages of the invention will become apparent from a reading of the following detailed description in conjunction with the accompanying drawings in which:

Fig. 1 illustrates schematically a side elevation in section of a preferred embodiment of the invention;

Figure 1A is a fragmentary view of the apparatus of Figure 1 showing the fuel control valve in a different operating position.

Fig. 2 illustrates a cross-section taken along lines 2—2 of Fig. 1;

Fig. 3 illustrates a detail of the fuel injection at the turbine stage; and

Fig. 4 illustrates an alternative arrangement of the turbine stage fuel injection of Fig. 3.

Having reference now to Fig. 1 of the drawings, the jet power plant is comprised of the primary engine 10 and afterburner of afterburner tailpipe 12. Only the after portion of the primary engine 10 is illustrated since the forward portion comprising an air intake and air compressor may be conventional. Compressed air, shown by arrows 14, from the compressor discharge enters the combustion chambers 16 where it mixes with primary fuel introduced into the chambers through injectors 18. This fuel-compressed air mixture is ignited by some suitable means such as a high tension spark ignition device 19 to produce primary engine combustion in the zones 20. The exhaust gases resulting from this combustion then pass through the turbine nozzle guide vanes 22, turbine blades 24, and out through the afterburner duct 12 to the ambient atmosphere. Turbine blades 24 are mounted on a hub 26 fixed to shaft 27 which drives the compressor. Directly behind or downstream of the turbine is mounted the inner tailcone 28 which with afterburner duct 12 defines the annular diffuser zone of the power plant.

While the nozzle 30 on afterburner 12 is illustrated schematically herein, it will be understood that it may be any suitable type of variable nozzle such, for example, as the two-position nozzle disclosed in copending application S. N. 59,944, filed Nov. 13, 1948, now abandoned, by Morris E. Nelson and Paul A. Pitt, or the continuously variable nozzle disclosed in copending application S. N. 150,127, filed March 17, 1950, by Ralph R. Kress.

Afterburner fuel is supplied in five possible stages through five annular conduits 31, 32, 33, 34 and 35. It will be seen from Figs. 1 and 2 that annular conduit 32 is entirely within the power plant while conduits 31, 33, 34 and 35 are all located in encircling relation externally of afterburner tailpipe 12 and internally of the airplane structure (not shown). Each of the latter, external conduits is provided with eight fuel injector pipes 36 which are spaced at 45° intervals around the conduit and extend radially into the engine. While the preferred embodiment of the invention provides eight fuel injectors 36 for optimum uniform fuel distribution it will be apparent that a larger or smaller number of injectors may be satisfactorily employed for each external conduit. As shown in Fig. 1, each fuel injector 36 has a plurality of fuel jet orifices 38 directed in the transverse and downstream directions.

The internally located annular conduit 32 is located adjacent the upstream side of the turbine guide vanes 22 and directs fuel downstream into the turbine through a plurality of orifices 40, Fig. 3. In this manner the fuel serves to cool vanes 22 and blades 24 by rapid quenching and evaporation. Fig. 4 illustrates a modified form of the second fuel stage wherein the fuel is injected through the trailing edges of each guide vane 22 so that the guide vanes are cooled by the flow of the fuel therethrough and blades 24 are cooled as before by the fuel directed against them.

In the illustrated embodiment fuel is pumped from a tank, not shown, by means of conventional pump 42 having intake line 44, discharge line 46 and an excess return line 48. Line 46 branches into lines 50 and 52 which conduct fuel to the second, third and fourth stages and the first and fifth stages, respectively. Line 50 connects directly with annular conduit 32 at the second stage, and by means of branch line 51 also connects with annular conduits 33 and 34 at the third and fourth stages, respectively. In the modification of the second fuel stage illustrated in Fig. 4, pipe 50 communicates with an annular passage 54 in the bases of the guide vanes 22. A tube 56 in each guide vane conducts the fuel from passage 54 to the trailing edge of the blade as shown.

Branch fuel line 52 terminates in a valve 58 which serves to direct the fuel either into line 60 leading to annular conduit 31 at the first stage or into line 62 leading to annular conduit 35 at the fifth stage. The piston 64 of valve 58 may be controlled in any suitable manner such as by means of a solenoid, not shown.

When the power plant is operated without afterburning pump 42 is shut off so that no afterburner fuel is supplied to any of the five fuel stages 31–35. During this time there will be primary engine combustion only in combustion chambers 16 in the manner hereinbefore described. The actual burning of the compressed air-fuel mixture occurs in the zones 20, and the resultant exhaust gases pass through the turbine 22—24 and out through afterburner duct 12 relatively unimpeded by the fuel injectors 36 so that thrust losses are kept at a minimum. When afterburning is desired or needed, pump 42 is switched on and, in the illustrated embodiment, pumps fuel to the second, third and fourth stages and either the first or fifth stage. Ordinarily, when afterburning is being initiated valve 64 is positioned to supply the fuel to the first stage.

As soon as fuel is sprayed from the fuel injectors 36 of the first stage it mixes with the exhaust gases moving downstream from the primary combustion zone 20, and the resultant mixture is almost instantaneously ignited by flames extending downstream from the primary combustion zone. Thus, there will be a secondary combustion zone approximately at 66 downstream of the first fuel stage. In a similar manner fuel injected by ring injector 32 at the second stage will be mixed with the exhaust gases from the primary and secondary combustion zones 20 and 66 and the resultant mixture will be ignited by downstream reaching flames from secondary combustion zone 66 and burned in another secondary combustion zone approximately at 68 just downstream of turbine 22—24. By the same process secondary combustion zones 70 and 72 will be established downstream of the third and fourth stages, respectively, and a secondary combustion zone 74 downstream of the fifth stage when fuel is injected therefrom. In this manner, stable afterburner combustion is spread progressively downstream through the power plant without the use of a separate afterburner ignition system.

It will be understood that the use of five fuel stages in the subject disclosure is merely illustrative, and that the invention contemplates the use of more or less stages depending upon the design characteristics of the primary engine, the type of installation and so forth. It is also contemplated that vaporized fuel or fuel vaporizers could be employed rather than the spray type fuel injectors illustrated. One of the primary principles upon which the present invention is based is that of injecting the afterburner fuel in stages at a rate proportional to the rate of heat of vaporization of the preceding stage of combustion. Thus, by locating the fuel distributing manifolds at properly spaced intervals proper stratification and successive maturization can be produced. Since the hot gases are moving at a rate higher than the rate of flame propagation, the "ignition lag" of the fuel will allow its movement downstream before complete burning occurs. By utilizing this time lag, together with the change in location of the combustible mixture, it becomes possible to add the afterburner fuel gradually which allows a more uniform rate of gas expansion through the afterburner tailpipe. More uniform gas expansion results in substantially decreasing the momentum loss which usually accompanies afterburning.

It will be observed that fuel injectors 36 of the first fuel stage have fewer jet orifices 38 than the remaining fuel injectors. The reason for this is that too much fuel must not be fed at the first stage because of the possibility of overheating the turbine vanes and blades 22—24. With the proper amount of fuel, however, trailing flames from secondary combustion zone 66 will pass through segments of the turbine to ignite the cooling fuel from the second stage.

After afterburning has been initiated valve 64 is positioned to supply the fuel to the fifth stage and cut off the supply to the first stage. This carries the combustion farther downstream in the afterburner tailpipe 12 and under normal conditions allows more complete burning. At high altitude, however, it has been found that the flame front retreats downstream very rapidly and may even pass out the nozzle orifice before combustion is complete. To avoid this situation at very high altitudes valve 64 may again be shifted to simultaneously supply fuel to the first stage and cut it off from the fifth stage. This not only increases the effective combustion length of the afterburner duct 12, but increases fuel pressure at the first four stages because the number of fuel orifices 38 in the injectors 36 at the first stage is considerably less than the number of orifices in the injectors at the fifth stage.

It will be apparent from the foregoing that the invention disclosed herein provides a novel afterburner structure which enables stable afterburning with a minimum amount of obstruction or solid matter in the afterburner tailpipe. Since the obstruction in the tailpipe is at a minimum the thrust losses during non-afterburning are materially reduced and the entire power plant is more efficient. In addition, the performance of the afterburner, and hence the power plant as a whole, is improved at high altitudes and blowout is less likely due to the closely controlled afterburning. The ignition system for the power plant is also simplified since no special afterburner ignition system is required. The invention has the further advantage of materially decreasing momentum loss in duct.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a jet power plant, a duct; a primary combustion zone for combusting fuel; means for supplying fuel to said primary combustion zone; a turbine downstream from said primary combustion zone actuated by gases issuing from said primary combustion zones; an inner cone in said duct downstream of said turbine; a plurality of fuel distributors mounted in said duct at predetermined positions upstream and downstream from said turbine for delivering fuel to said duct and defining a consecutive series of secondary combustion zones, at least one of said distributors being positioned opposite said cone and at least one other of said distributors being positioned downstream of said cone; a fuel source; means for conducting fuel from said source to said fuel distributors; ignition means for igniting fuel in said primary combustion zone; and selector means adapted to alternately selectively permit and prevent fuel flow from a first of said fuel distributors for controlling combustion in said duct whereby the ignition of fuel from the first of said fuel distributors by a flame front from said primary combustion zone propagates the flame front to permit progressive ignition of fuel from successive fuel distributors to maintain stable combustion of fuel in each of said secondary combustion zones.

2. In a jet power plant having a duct; structure forming a primary combustion zone in said duct; means for supplying fuel to said primary combustion zone; a turbine downstream of said primary combustion zone actuated by gases issuing therefrom; a consecutive series of fuel distributors in said duct upstream and downstream from said turbine for mixing fuel with the exhaust gases from said primary combustion zone and defining successive secondary combustion zones; ignition means for igniting fuel in said primary combustion zone whereby a flame front therefrom ignites fuel in said successive secondary combustion zones; and selector means alternately selectively permitting and preventing fuel flow to a first and last of said series of fuel distributors to control combustion whereby complete and stable combustion is maintained wholly within said duct for maximum efficiency.

3. In a jet power plant, a duct; a primary combustion zone for combusting fuel; means for supplying fuel to said primary combustion zone; a turbine downstream from said primary combustion zone actuated by gases issuing from said primary combustion zone; a plurality of fuel pipes mounted in said duct at predetermined positions upstream and downstream from said turbine for delivering fuel to said duct and defining a consecutive series of secondary combustion zones; openings in said fuel pipes for permitting fuel to enter said duct; a fuel source; means for conducting fuel to said pipes; ignition means for igniting fuel in said primary combustion zone to establish a flame front to ignite fuel in said consecutive series of secondary combustion zones; and selector means alternately selectively permitting and preventing fuel flow to a first and last of said fuel pipes to control combustion whereby fuel is selectively fed to said first and last of said pipes to assure complete and stable combustion wholly within the duct for maximum efficiency.

4. The device as set forth in claim 3 wherein the number of openings in said fuel pipes for admitting fuel to said duct progressively increase in the downstream fuel pipes whereby fuel is added through said fuel pipes at a rate proportional to the heat of vaporization in the preceding zone of combustion to give a more uniform expansion of the exhaust gases and improved efficiency.

5. In a jet power plant, a duct; a primary combustion zone for combusting fuel; means for supplying fuel to said primary combustion zone; a turbine downstream from said primary combustion zone actuated by gases issuing from said primary combustion zone; a cone mounted in said duct downstream of said turbine; a consecutive series of fuel pipes mounted in spaced predetermined positions in said duct upstream and downstream from said turbine defining a series of consecutive secondary combustion zones, at least one of said fuel pipes being positioned downstream of said cone; a fuel source; means for conducting fuel to said fuel pipes; ignition means for igniting fuel in said primary combustion zone, and outlets in said fuel pipes increasing in number in successive fuel pipes for admitting fuel to said duct at a rate proportional to the heat of vaporization in the preceding zone of combustion to maintain the momentum of the exhaust gases and assure maximum efficiency.

6. In a jet power plant, a duct; a primary combustion zone for combusting fuel; means for supplying fuel to said primary combustion zone; a turbine downstream from said primary combustion zone actuated by gases issuing from said primary combustion zone; a cone mounted in said duct downstream of said turbine; a plurality of fuel distributor assemblies mounted in said duct downstream from said turbine and defining a series of consecutive secondary combustion zones, each of said fuel distributor assemblies comprising a plurality of circumferentially spaced radially extending pipes and at least one of said assemblies being positioned downstream of said cone and the fuel pipes of successive distributor assemblies being of greater length than the pipes of the preceding assemblies and having successively increasing numbers of fuel outlets for admitting fuel to said duct in increasing quantities to maintain the momentum of the exhaust gases and assure maximum efficiency.

References Cited in the file of this patent

UNITED STATES PATENTS

| | | |
|---|---|---|
| 2,326,072 | Seippel | Aug. 3, 1943 |
| 2,417,445 | Pinkel | Mar. 18, 1947 |
| 2,506,611 | Neal et al. | May 9, 1950 |
| 2,508,420 | Redding | May 23, 1950 |
| 2,520,388 | Earl | Aug. 29, 1950 |
| 2,520,967 | Schmitt | Sept. 5, 1950 |
| 2,566,373 | Redding | Sept. 4, 1951 |
| 2,572,723 | Hildestad | Oct. 23, 1951 |
| 2,640,316 | Neal | June 2, 1953 |

FOREIGN PATENTS

| | | |
|---|---|---|
| 981,045 | France | Jan. 10, 1951 |